United States Patent
Schwindt et al.

(10) Patent No.: US 12,351,209 B2
(45) Date of Patent: Jul. 8, 2025

(54) METHOD AND DEVICE FOR OPERATING A ROBOT WITH IMPROVED OBJECT DETECTION

(71) Applicant: Robert Bosch GmbH, Stuttgart (DE)

(72) Inventors: Oliver F. Schwindt, Sunnyvale, CA (US); Joerg Mueller, Mountain View, CA (US); Theresa Kienle, Stuttgart-Neugereut (DE); Andrei Vatavu, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 17/424,387

(22) PCT Filed: Mar. 17, 2020

(86) PCT No.: PCT/EP2020/057224
§ 371 (c)(1),
(2) Date: Jul. 20, 2021

(87) PCT Pub. No.: WO2020/193273
PCT Pub. Date: Oct. 1, 2020

(65) Prior Publication Data
US 2022/0119007 A1  Apr. 21, 2022

(30) Foreign Application Priority Data
Mar. 22, 2019  (DE) ...................... 10 2019 107 443.6

(51) Int. Cl.
*B60W 60/00* (2020.01)
*B60W 50/02* (2012.01)
(Continued)

(52) U.S. Cl.
CPC .... *B60W 60/0011* (2020.02); *B60W 50/0205* (2013.01); *B60W 50/029* (2013.01);
(Continued)

(58) Field of Classification Search
CPC ......... B60W 60/0011; B60W 50/0205; B60W 50/029; B60W 2050/0215; B60W 2050/0292; G06V 20/58; G06V 10/80
See application file for complete search history.

(56) References Cited

U.S. PATENT DOCUMENTS 10,831,188 B2 * 11/2020 Hammond ........... G05D 1/0055
11,474,202 B2 * 10/2022 Alvarez ................ G01S 15/931
(Continued)

FOREIGN PATENT DOCUMENTS

DE  10 2017 206 123 A1  10/2018
DE     102017113478 A1 * 12/2018
(Continued)

OTHER PUBLICATIONS

DE-102017113478 Translation (Year: 2018).*
(Continued)

*Primary Examiner* — Aniss Chad
*Assistant Examiner* — Christopher George Fees
(74) *Attorney, Agent, or Firm* — Maginot, Moore & Beck LLP (57) ABSTRACT

A method and device are disclosed for improved object detection in an area surrounding a robot. In the method, first and second sensing data are obtained, which can be assigned to a first or second sensing means of the robot, respectively, and which contain at least one portion of the area surrounding the robot. An objection detection of an object in the area surrounding the robot is carried out using a fusion of at least the first and the second sensing data. An item of redundancy information is generated, which is assigned to the object detection and at least indicates whether the detected object has been detected using only the first or only the second sensing data or whether the detected object or at least one or (Continued)

more sections of same has been detected redundantly using both the first and the second sensing data.

20 Claims, 2 Drawing Sheets (51) Int. Cl.
    *B60W 50/029* (2012.01)
    *G06V 10/80* (2022.01)
    *G06V 20/58* (2022.01)
(52) U.S. Cl.
    CPC .............. *G06V 10/80* (2022.01); *G06V 20/58* (2022.01); *B60W 2050/0215* (2013.01); *B60W 2050/0292* (2013.01)

(56) References Cited

U.S. PATENT DOCUMENTS

| | | | |
|---|---|---|---|
| 11,475,351 B2* | 10/2022 | Luo | G06V 10/82 |
| 11,500,099 B2* | 11/2022 | Liang | G06N 3/02 |
| 2007/0043491 A1* | 2/2007 | Goerick | G06V 20/58 |
| | | | 701/41 |
| 2009/0268947 A1* | 10/2009 | Schaufler | G06V 20/58 |
| | | | 382/104 |
| 2012/0330528 A1* | 12/2012 | Schwindt | G01S 13/58 |
| | | | 701/96 |
| 2013/0002470 A1* | 1/2013 | Kambe | G01S 13/931 |
| | | | 342/55 |
| 2015/0081188 A1 | 3/2015 | Kornhaas | |
| 2015/0109164 A1* | 4/2015 | Takaki | G01S 13/931 |
| | | | 342/27 |
| 2017/0287233 A1* | 10/2017 | Nix | G08G 1/166 |
| 2019/0049958 A1* | 2/2019 | Liu | G01S 17/00 |
| 2019/0161274 A1* | 5/2019 | Paschall, II | G05D 1/0246 |
| 2020/0211394 A1* | 7/2020 | King | G06V 20/58 |
| 2021/0133486 A1* | 5/2021 | Yu | G05B 19/042 |
| 2021/0163021 A1* | 6/2021 | Frazzoli | H04W 4/48 |

FOREIGN PATENT DOCUMENTS

| | | |
|---|---|---|
| EP | 1 754 621 A1 | 2/2007 |
| EP | 2 107 503 A1 | 10/2009 |

OTHER PUBLICATIONS

International Search Report corresponding to PCT Application No. PCT/EP2020/057224, mailed Jun. 22, 2020 (German and English language document) (5 pages).

* cited by examiner

METHOD AND DEVICE FOR OPERATING A ROBOT WITH IMPROVED OBJECT DETECTION

This application is a 35 U.S.C. § 371 National Stage Application of PCT/EP2020/057224, filed on Mar. 17, 2020, which claims the benefit of priority to Serial No. DE 2019 107 443.6, filed on Mar. 22, 2019 in Germany, the disclosures of which are incorporated herein by reference in their entirety.

The present disclosure relates to a method for operating a robot, in particular a robot which moves at least partially in an automated manner. Further, the disclosure relates to a computer program which is suitable to carry out the method, as well as a machine-readable memory medium with such a computer program.

BACKGROUND

In particular in the field of automation technology, robotics, etc., for example in the field of at least partly autonomous robots, in particular of at least partially autonomous vehicles, a plurality of sensors can be used to detect the environment of a robot and thereby to collect detection data and based thereon to control a robot at least partially automatically. Different types of sensors can be used, such as a camera, radar sensors, lidar sensors, etc., of which a number of sensors of the same type (a number of cameras at different positions of the robot and/or with different viewing angles) and/or a number of sensors of different types (one or more cameras and additionally one or more radar sensors, lidar sensors, etc.) can be used concurrently with each other.

These different sensor types usually have different detection capabilities, wherein a camera may provide for example camera images of the environment of the robot as detection data, whereas for example radar sensors can determine distances to other objects and provide them as detection data. In principle, each type of sensor can either detect an object which can be detected, or which is to be detected, can miss the object during detection and consequently not detect it at all and can detect an object that does not exist at all in reality, i.e. can detect it erroneously. It is also possible for a sensor to detect only a part of an object or to detect the object as smaller or larger than it actually is. It is therefore desirable to have more reliable detection of objects in the environment of the robot.

SUMMARY

Embodiments of the disclosure provide an improved capability for the detection and/or assessment of objects in an environment of a robot. Advantageous developments of the disclosure result from the description and the accompanying figures.

A first aspect of the disclosure provides a method for the operation of an in particular at least partially autonomous robot. The robot can generally be an automatically moving robot. For example, such an in particular at least partially autonomous robot can be in the form of an at least partially autonomous vehicle, which may, for example, also be a highly or fully autonomous vehicle, or generally a mobile robot which moves by flying, floating, submerging or walking. In terms of the vehicle technology, a highly automated or highly autonomous vehicle can be understood to be a vehicle which can carry out at least predefined driving functions independently without the intervention of a human vehicle driver. Accordingly, such a vehicle can have actuators and/or a vehicle drive, which can be electronically activated for at least partially automated driving control of the vehicle, for example for accelerating, braking, steering, etc. A fully automated vehicle can perform independently in at least almost all typical driving situations and in principle can participate in road traffic without the intervention of a human vehicle driver.

The method, which may be computer-implemented in particular, includes the following steps:

In one step of the method, first detection data are obtained, which can be associated with a first detection device of the robot and in which at least a subsection of the environment of the robot is included.

A first detection device can be understood in this context in particular to be a single sensor or an arrangement of a number of sensors of the robot, such as one or more cameras, one or more radar sensors, an arrangement of lidar sensors, etc.

In a further step of the method, second detection data are obtained, which can be associated with a second detection device of the robot and in which at least a subsection of the environment of the robot is included.

A second detection device can also be understood to be a single sensor or an arrangement of a number of sensors of the robot, such as one or more cameras, one or more radar sensors, an array of lidar sensors, etc. The first and the second detection devices may be similar to each other in terms of their sensor technology, i.e. for example in the form of a combination of a first and a second camera with possibly different angles of view, or may be different from each other, i.e. for example the combination of one or more cameras as the first detection device and one or more radar sensors as the second detection device.

According to a further step of the method, an object detection of an object in the environment of the robot is carried out by means of the fusion of at least the first and the second detection data. It should be noted that the fusion can also be carried out for more than two, for example three, four, five, six or more detection devices. The description of first and second detection data is only intended to indicate that a plurality of detection data, in particular sensor data, are fused.

In other words, a sensor fusion is carried out in which one or a number of dynamic and/or static objects in the environment of the robot can be detected on the basis of a number of detection data from a number of sensors of the same or different type. The object detection can, for example, include one or more classification methods for object classification, if appropriate using a classification system, a machine learning system or similar.

In a further step of the method, redundancy information is generated which may be or is associated with the object detection, which at least indicates whether the detected object has been detected based on only the first or only the second detection data, or whether the detected object or at least one or more sections of the same has been detected redundantly on the basis of both the first and the second detection data. For example, the redundancy information can be understood (or can be implemented) to be a list which identifies redundantly detected parts of the object.

To date, various approaches to object detection are known, in which only the fusion of available sensor data is used. These well-known approaches to object detection can be robust against non-detection of an object, since in principle, non-detection of an object only occurs if no sensors have been detecting an object. However, these approaches are not robust against erroneous detection because the erroneous detections of all sensors have essentially been summed. The reverse approach is that an object must necessarily be detected by a number of sensors. This approach is robust against erroneous detections, but non-detections have summed, so that objects which only a single sensor detects would be ignored.

The method proposed here, on the other hand, enables an improved response to objects in the environment of the robot by a combination the object detection generated by the sensor fusion with the additional information about possibly redundantly captured or detected parts of the object in the redundancy information. In particular, the object detection can be improved both with regard to a non-detection of an object and with regard to an erroneous detection of an object. As a result, an at least partially automated driving control can react more appropriately to the environment of the robot, for example by not reacting at all to a potentially erroneously detected object, i.e. an object that does not actually exist in the environment of the robot at all, or by only reacting with a comparatively weak robot activation or a weak control maneuver. Or it will react with a comparatively strong robot activation or a strong control maneuver to an object which, due to the redundancy information, is most likely to actually be in the environment of the robot. With regard to the vehicle technology, the control maneuver can be a driving maneuver.

An erroneous detection of an object can be caused by various disturbing effects during the operation of the robot, such as glare on sensors by solar radiation, shadow formation by the object to be detected itself or by other objects in the environment of the robot, fouling of sensors, damage to sensors, etc. However, the redundancy information increases the information content about the object, so that a more reliable object assessment is enabled. In the case of an erroneous detection, an object can also be detected with a smaller or larger object size than the object has in reality.

According to a further development, the robot can be controlled or activated at least partially automatically on the basis of the object detection and the redundancy information, i.e. on the basis of both the object detection and the redundancy information. As a result, an erroneous detection of an object can be excluded more reliably, so that, for example, comparatively strong control maneuvers, such as a braking maneuver with strong or maximum deceleration, are not planned and/or carried out by the at least partially automated driving control.

In a further development, control data for at least partially automated control of the robot can be generated on the basis of the object detection and the redundancy information, i.e. taking into account both forms of information, wherein the control data may include first control data which are associated with a first control maneuver if the object has not been detected redundantly, or may include second control data which are associated with a second control maneuver which is different from the first control maneuver if the object has been detected redundantly. In other words, the automated control of the robot may be carried out depending on a probability of an erroneous detection of one or a number of objects in the environment of the robot. The first control maneuver may be, for example, a braking maneuver with a comparatively low deceleration, such as 3.5 m/s, or an evasive maneuver with a small steering angle, which is carried out if the object is detected by one sensor, but an erroneous detection cannot be excluded due to the lack of redundant detection by at least one other sensor. The second control maneuver, on the other hand, may be motion-dynamically stronger than the first control maneuver, also driving-dynamically in relation to the vehicle technology, since in this case at least two sensors at least have detected parts or subsections of the object, so that an erroneous detection of the object is at least less likely. Accordingly, the second control maneuver can be carried out, for example, with a stronger deceleration and/or a larger steering angle.

According to a further development, if the object has not been captured and/or detected redundantly, the at least partially automated control of the vehicle can be deferred until an update of the redundancy information, in order to decide (then delayed in time) whether the object has been detected erroneously. In other words, the automated driving control of the vehicle can for example be carried out delayed in time until the next detection cycle of the detection devices, wherein the cycle time may be in the millisecond range, for example. An erroneously detected object can be short-lived in terms of its detectability, so that with updated detection data an erroneously detected object may then no longer be detected. By deferring a reaction of the vehicle control, this can be taken into account, so that the quality can be raised further by the exclusion of erroneous detections.

In a further development, if the object has not been detected redundantly or the probability of redundant object detection is below a threshold value, (only) the first control maneuver can be planned and/or controlled initially, which causes a motion-dynamically weaker reaction of the vehicle than for the second control maneuver, driving-dynamically weaker in relation to the vehicle technology, and after an update of the redundancy information, in addition, the second control maneuver can be planned and/or controlled if the object has now been detected as redundant in the updated redundancy information. In other words, the automated activation of the robot, for example the automated driving control of the vehicle, may be carried out in a time-delayed manner, for example up to the next detection cycle of the detection devices, wherein the cycle time for example may be in the millisecond range. If the object, which may have been erroneously detected due to the non-redundant detection, has now been detected redundantly by the same or the other detection device, the object was at least already reacted to by the first control maneuver, in order to then reduce the second control maneuver, for example motion-dynamically or driving-dynamically, which is then still required. Thus, no reaction time is lost, but a motion-dynamically or driving dynamically comparatively weak and then stronger reaction to the detected object is made.

According to a further development, if the object has not been detected redundantly, the second control maneuver, which causes a driving-dynamically stronger reaction of the robot than the first control maneuver, can be controlled without previous control of the first control maneuver if a hazard to the environment of the robot due to the second control maneuver can be excluded on the basis of the first and/or second detection data. In other words, for safety's sake, a potentially erroneously detected, i.e. non-existent object is reacted to with the driving dynamically comparatively stronger second control maneuver, if, for example, the traffic behind has been detected, for example by one or more rear-facing detection devices in the direction of travel, as far enough away from the robot to also carry out a strong deceleration maneuver, for example a braking maneuver, with a comparatively strong deceleration. Equally, an avoidance steering maneuver can be carried out with the second control maneuver, for example, if there is passable space next to the robot or vehicle.

In a further development, the second control maneuver can be controlled if it is determined, for example predicted, approximated, etc., that the object could actually be detected on the basis of both the first and the second detection data, although the redundancy information indicates the object as not redundantly detected. This can happen, for example, if other detection direction or sensors for example are blinded by fouling or coverage, are physically damaged, have been switched off due to a misalignment, if the object to be detected by them is obscured by another object or otherwise cannot be detected. In such a detected case, the driving-dynamically stronger control maneuver then nevertheless be carried out.

According to a further development, the object detection, which may be based on or may include an object description, can be carried out by a plurality of different methods for object description. A possible object description is a two-dimensional (2-D) polygon with a height perpendicular to the polygon, which can correspond to a 2.5-dimensional description of the world. The object detection can also be carried out on the basis of a three-dimensional (3D) polygon description. Optionally, a bounding box can be used to be arranged around the object, which is particularly helpful when a velocity, acceleration and/or yaw rate of dynamic objects are to be taken into account. This can facilitate a faster search for potential objects or relevant objects. The polygon describes the shape and/or outline of the object which has been detected and/or recognized and which can be considered to be part of the space which is known to be occupied by the object. The polygon model can be described by a set of points, wherein the more points can be used the more accurate the object description.

In a further development, the object detection may include an approximation of an overall object outline based on the fusion of at least the first and second detection data. Accordingly, an overall object outline may be associated with an object, wherein the object or parts thereof has been detected from a number of detection directions. The overall object outline may be described and/or represented, for example, by a polygon. The approximation can, for example, be based on a feature extraction, a feature segmentation, a determination of an optical flow, etc. When approximating the overall object outline, parts or subsections of the object, the first part of which has been detected by only one of the detection devices and a second part of which has been detected by only one other of the detection devices, can be surrounded by or can be parts of the total object outline. To approximate the overall object outline, parts or subsections can be associated with the object by, for example, determining their speed relative to the robot on the basis of the individual or fused detection data. Such an association can be made additionally or alternatively also by the fact that parts or subsections of the object can be associated due to their size, for example their surface area, which can be described as the area content of a polygon, a certain object class, based on an at least partially autonomous vehicle, for example another motor vehicle, a truck, a bus, etc. For this purpose, one or more threshold values may be specified in order to be able to take into account tolerances of velocities, size, etc.

According to a further development, the object detection may include an approximation of at least a first partial object outline based on the first detection data and an approximation of at least a second partial object outline based on the second detection data, and wherein in the redundancy information the object is indicated as detected redundantly if both the first and the second partial object outlines can be associated with the object. The respective partial object outlines may be connected to each other or may not be connected to each other. Unconnected partial object outlines can occur, for example, when a camera (as for example a first detection device) can detect an obstacle (as an object) approximately completely and a radar sensor (as for example a second detection device) can detect only a rear and/or a wheel of the obstacle. If at least two partial object outlines could be approximated, the redundancy information can include the number, type, position, etc. of the detected partial object outlines, for example.

In a further development, the first partial object outline and the second partial object outline can be associated with the object on the basis of their respective feature vectors which can be associated with an object class. The respective feature vector can, for example, include information about a velocity of the respective partial object outline, information about the type of object, etc.

A second aspect of the disclosure provides a device which is set up to carry out the method described above in one or more of the embodiment variants described. The device can be for example in the form of an electronic control unit or of a group of control units. In addition, the device may have at least one processor, a memory, such as a volatile and a non-volatile memory, one or more data interfaces to detection devices, such as sensors, of the robot, and/or to robot actuators, a communication interface, which can be set up for Car-to-X communication, etc.

A third aspect of the disclosure relates to a computer program including commands which, when they are executed by a computer, cause this to carry out a method according to the first aspect.

The computer program may, for example, be loaded and/or stored in a memory of a data processing device, such as a data processor, wherein the data processing device may also be part of an embodiment of the present disclosure. The data processing device may also be set up to carry out steps of the method described above. The data processing device may also be set up to carry out the computer program or the method automatically and/or by user inputs. The computer program may also be provided via a data network, such as the Internet, and downloaded from such a data network into the memory of the data processing device. The computer program can also include updating an existing computer program, wherein the existing computer program can be enabled to carry out the method described above, for example.

A fourth aspect of the disclosure relates to a machine-readable memory medium, in which a computer program according to the fifth aspect is stored.

The machine-readable memory medium may in particular, but not necessarily, be a non-volatile medium, which is particularly suitable for storing and/or distributing a computer program. The machine-readable memory medium may be a CD-ROM, a DVD-ROM, an optical memory medium, a solid-state medium, or similar, which is provided with or as part of other hardware. In addition or alternatively, the machine-readable memory medium can also be distributed or dispersed in another form, for example over a data network, such as the Internet or other wired or wireless telecommunications systems. For this purpose, the machine-readable memory medium may be implemented as one or more data packets, for example.

Further, measures which improve the disclosure are shown in more detail below together with the description of the preferred exemplary embodiments of the disclosure on the basis of figures.

BRIEF DESCRIPTION OF THE FIGURES

Advantageous exemplary embodiments of the disclosure are described in detail below with reference to the accompanying figures. In the figures.

The figures are only schematic and not true to scale. In the figures, identical, equivalent or similar elements are provided with the same reference characters.

DETAILED DESCRIPTION

Figure 1:
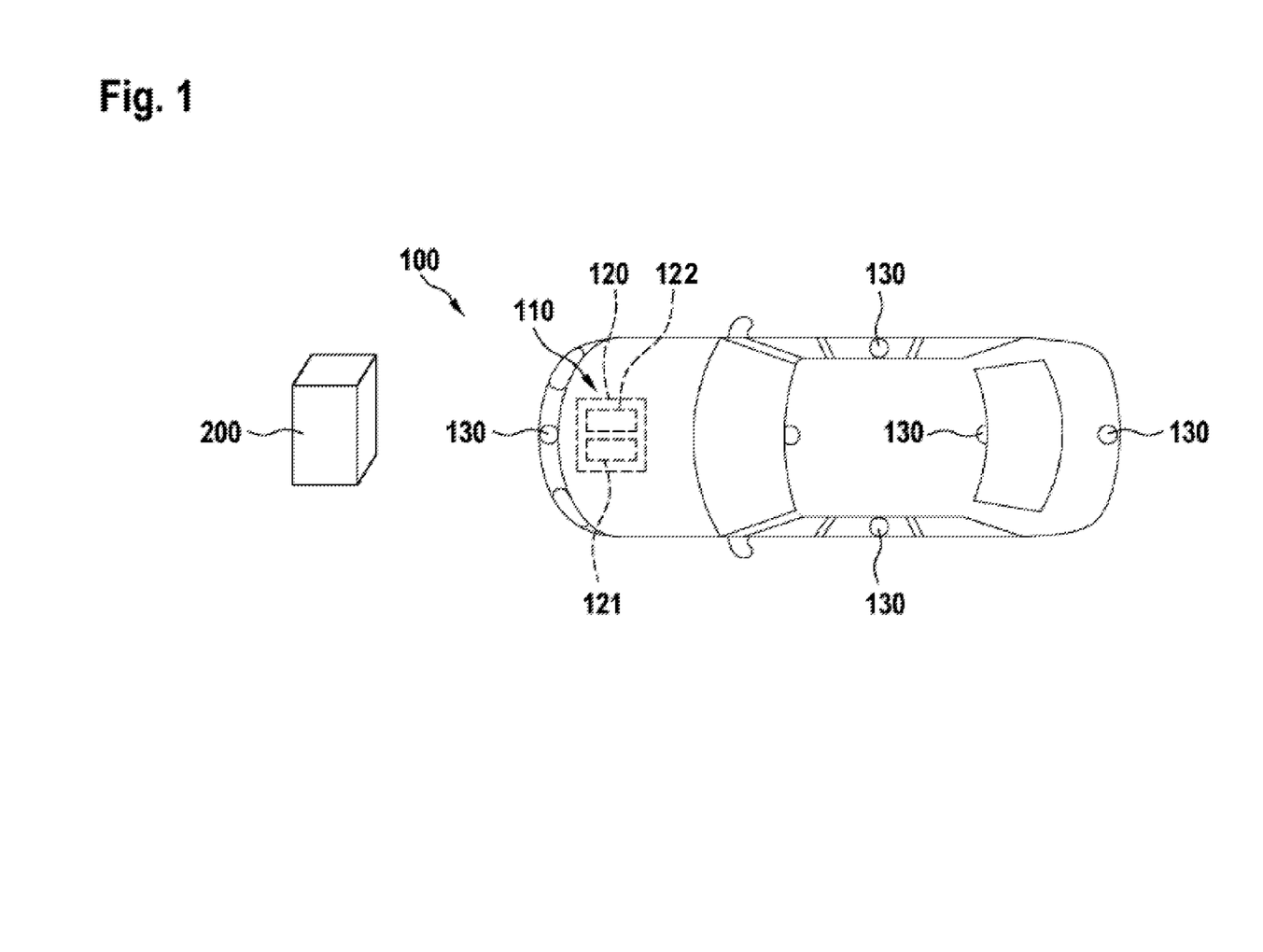
FIG. 1 shows a robot, which is in the form of a vehicle here by way of example, with a device set up for the detection of an object in the environment of the robot.

FIG. 1 shows an at least partially autonomous robot 100, which is in the form of a vehicle here only by way of example and is hereinafter referred to as such. Here, by way of example, the vehicle 100 is an at least partially autonomous, but in particular a highly or fully autonomous, motor vehicle. Accordingly, the vehicle 100 has actuators and a vehicle drive (not referenced in detail), which can be electronically activated for automated driving control of the vehicle 100, for example for accelerating, braking, steering, etc. Alternatively, the at least partly autonomous robot may also be another mobile robot (not shown), for example one that moves by flying, floating, submerging or walking. The mobile robot, for example, may also be an at least partly autonomous lawnmower or an at least partly autonomous cleaning robot. Also in these cases one or more actuators, for example a drive and/or the steering of the mobile robot, may be activated electronically in such a way that the robot moves at least partly autonomously.

The vehicle 100 further has a device 110 which is set up for the detection of objects in the environment of the robot, i.e. in the environment of the vehicle in relation to the vehicle 100, and in particular for the detection of at least one object 200 in the environment of the vehicle. The device 110 has a data processing device 120, for example in the form of a computer or an electronic control unit, which may also be set up to activate the actuators and the vehicle drive. This actuation can be carried out by means of corresponding control signals, which are generated and output by the device 110 or the data processing device 120 and which are received and processed by the actuators and the vehicle drive. The data processing device 120 has a processor 121 and a data memory 122 for storing program instructions or a computer program for operating the vehicle 100 and/or for the detection of objects in the environment of the vehicle. For example, a machine learning system in the form of one or more types of neural networks, KNN, may be implemented in the data processing device 120. In addition, the vehicle 100 has a plurality of detection devices or sensors 130, such as optical sensors, such as cameras, ultrasonic sensors or radar sensors, lidar sensors, etc., which monitor or detect the environment of the vehicle 100. Detection data of the sensors 130 are made available to the data processing device 120 or the device 110, which is set up to plan a driving strategy, which may include for example one or more control maneuvers, i.e. driving maneuvers related to the vehicle 100, on the basis of the detection data, and to activate the vehicle actuators and/or the traction drive accordingly. Accordingly, the data processing device 120 or the device 11 is set up to receive, for example, the different detection data of the sensors 130 as input data, to process, in particular to fuse, these data and possibly additionally supplied and/or generated (intermediate) data, and to provide output data based on the processing and/or obtained therefrom to one or more vehicle systems, such as the actuators and the vehicle drive. The input data and/or output data can be supplied and provided as signals for electronic data processing.

Figure 2:
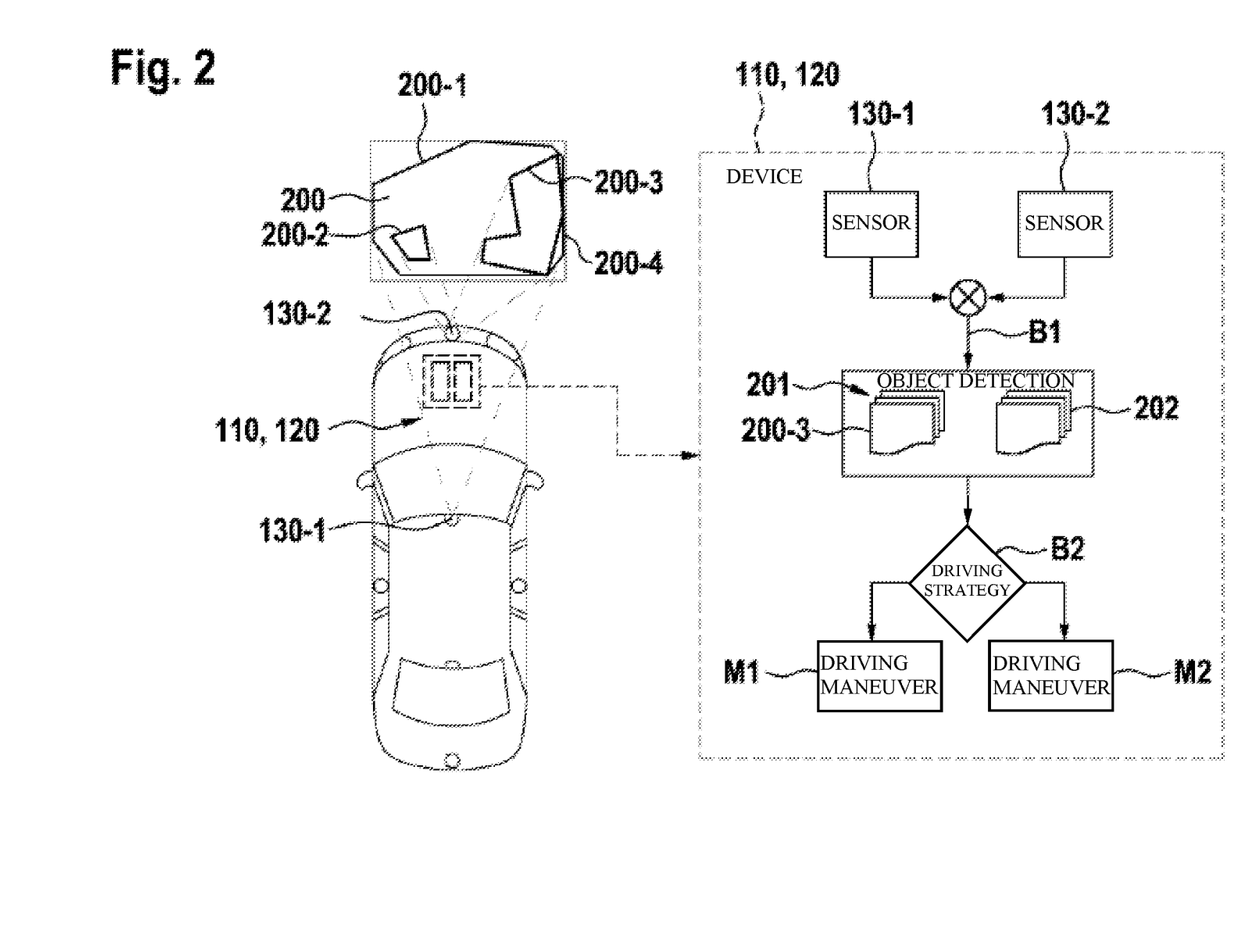
FIG. 2 shows a block diagram illustrating a method for detecting an object in the environment of the robot.

FIG. 2 shows in a block diagram how the detection of the object 200 in the environment of the vehicle and the coordinated planning of a driving strategy appropriate to the situation can be carried out by means of the device 110 or the data processing device 120. The object 200, which is another road user for example, is located in front of the vehicle 100 in the direction of travel of the vehicle 100 only by way of example here. It will be understood that the object 200 can also be located relative to the vehicle 100 at other positions of the environment of the vehicle and consequently can be detected by another combination or fusion of the sensors 130.

As indicated in FIG. 2 by the reference characters 130-1, 130-2 used, the object 200 is detected here by a plurality of the sensors 130, wherein with this exemplary embodiment two sensors 130-1 and 130-2 are used by way of example, which in this exemplary embodiment are of different types. Only by way of example, the sensor 130-1 is a lidar sensor assembly and the sensor 130-2 is a camera, wherein other combinations of the sensors 130 are possible. According to FIG. 2, the object 200 or a subsection of the same is detected, for example by the sensor 130-1, and one or more (here by way of example two) further subsections of the object 200 are detected by the sensor 130-2, for example, and the (first and second) detection data derived therefrom are supplied to the device 110 or the data processing device 120, as indicated in FIG. 2 within the device 110 or the data processing device 120 represented by a dashed rectangle. In this case the first and second detection data of the sensors 130-1, 130-2 associated with this are fused in a block designated by B1 to generate an object detection 201 from these fused detection data. In this case, one or more object detection methods and/or object assessment methods may be applied, which may also include feature extraction, determination of the optical flow, semantic segmentation, object classification and similar.

The device 110 or the data processing device 120 is set up to approximate a first object outline 200-1 from the detection data of the first sensor 130-1 (which may be a partial object outline or a total object outline), which at least approximately describes the object 200 detected by the first sensor 130-1 in the form of an associated outline. The first partial object outline 200-1 is described here as a polygon.

In addition, the device 110 or the data processing device 120 is set up to approximate a second partial object outline 200-2 and a third partial object outline 200-3 from the detection data of the second sensor 130-2, which at least approximately describes the subsections of the object 200 detected by the second sensor 130-2 in the form of associated outlines. The second and third partial object outlines 200-2, 200-3 are described here as polygons. It should be noted that alternatively the first object outline 200-1 can be approximated from a detection by means of one of the sensors 130, and each one of the partial object outlines 200-2, 200-3 can be approximated by means of two more of the sensors 130.

The device 110 or the data processing device 120 is optionally also set up to approximate a bounding box 200-4, as indicated in FIG. 2 by a rectangle.

Furthermore, the device 110 or the data processing device 120 is set up to approximate a total object outline of the object 200 from the fused detection data of the first sensor 130-1 and the second sensor 130-2, which at least substantially corresponds to the first object outline 200-1 here. The object outline or the total object outline 200-1 is described here as a polygon only by way of example and approximates the object 200 with high accuracy based on the fused detection data.

In this exemplary embodiment, the total object outline 200-1 includes the first and second partial object outlines 200-2, 200-3, which, for example due to their respective feature vector, which for example includes a respective velocity relative to the vehicle 100 or other suitable features, are to be associated with the first and second partial object outlines 200-1, 200-2 of the total object outline 200-1 and thus to the object 200 or the object detection 201. In other words, the object 200 has been detected redundantly by means of the first and second sensors 130-1, 130-2, namely by detecting each subsection of the object 200.

As indicated in FIG. 2, the object 200 is not only described based on the object detection 201 or the total object outline 200-1, but additionally also by redundancy information 202, which here contains by way of example an indication of whether the detected object 200 has been detected on the basis of only the first detection data or only the second detection data, or whether the detected object 200 or at least one or more subsections of the same has been detected redundantly on the basis of both the first and the second detection data. In this exemplary embodiment, the redundancy information 202, which may be a data field or similar for example, includes information about the first and second partial object outlines 200-2, 200-3. Thus, the object 200 is described by the object detection 201 or the total object outline 200-1 and the redundancy information 202, wherein the latter shows that the object 200 has been detected redundantly by both the first sensor 130-1 and the second sensor 130-2 in this exemplary embodiment. In addition, the redundancy information 202 also contains here information about which subsections, which are described for example by the partial object outlines 200-2, 200-3, have been detected redundantly.

As indicated in FIG. 2 with the block B2, the device 110 or the data processing device 120 is set up to plan a driving strategy depending on the object outline 200-1 and the redundancy information 202, wherein in this exemplary embodiment only by way of example a first driving maneuver M1 and a second driving maneuver M2 are distinguished. Further, the device 110 or the data processing device 120 is set up, based on the object detection 201 or the total object outline 200-1 and the redundancy information 202, to generate control data for at least partially automated control of the vehicle 100. The control data may be provided, for example, as output signals and are supplied to the actuators and/or the vehicle drive as input signals. The control data include first control data which are associated with the first driving maneuver M1 if the object 200 has not been detected redundantly (which does not apply in this exemplary embodiment for better illustration, however). Or the control data include second control data, which are associated with the second driving maneuver M2, which is different to the first driving maneuver M1, if the object 200 has been detected redundantly. Only by way of example, the first driving maneuver M1 is driving-dynamically weaker than the second driving maneuver M2, which in practice can mean for example a braking maneuver with lower deceleration or similar.

Since the object 200 has been captured or detected redundantly here, the device 110 or the data processing device 120 can decide, for example statistically or by another suitable method, that the object 200 is not an erroneous detection, such as a ghost image due to a shadow formation or similar, and can activate the driving-dynamically stronger driving maneuver M2. The second driving maneuver M2 corresponds, for example, to a braking maneuver with comparatively strong deceleration, such as full braking with maximum brake pressure, and/or a steering maneuver for evasion to prevent a collision with the object 200.

The sensors 130 provide current detection data of the environment of the vehicle continuously, for example cyclically. In some exemplary embodiments, the device 110 or the data processing device 120 is set up to defer control of the vehicle 100 until an update of the redundancy information 202 on the basis of the constantly updated detection data to decide after a time delay whether the object 200 has been detected erroneously. This can be particularly useful if the object 200 has not been detected redundantly (at least not yet).

In some exemplary embodiments, the device 110 or the data processing device 120 is further set up to cause the first driving maneuver M1, which causes a driving-dynamically weaker reaction of the vehicle 100 than the second driving maneuver M2 if the object 200 has not been detected redundantly. After the update of the redundancy information 202 described above, then the second driving maneuver M2 is then additionally caused if appropriate, provided that on the basis of the updated redundancy information 202 it can be concluded that the object detection 201 is not an erroneous detection and therefore the second driving maneuver M2 is necessary to react adequately to this traffic situation.

In some exemplary embodiments, the device 110 or the data processing device 120 is further set up, if the object 200 has not been detected redundantly, to immediately cause the second driving maneuver M2 without prior control of the first driving maneuver M1 if on the basis of the detection data of one or more of the sensors 130 a hazard to the environment of the vehicle by the second driving maneuver M2 can be excluded. For example, because a following vehicle is at a long distance from the vehicle 100 or a neighboring lane is free and so on.

In some exemplary embodiments, the device 110 or the data processing device 120 is further set up to immediately cause the second driving maneuver M2 if it is determined that the object 200 could actually have been detected based on both the first and the second detection data, although the redundancy information 202 indicates the object 200 as not redundantly detected.#

The invention claimed is:

1. A method for operating a robot, the method comprising:
obtaining first detection data, from a first detection device of the robot, associated with a first subsection of an environment of the robot;
obtaining second detection data, from a second detection device of the robot, associated with a second subsection of the environment of the robot;
generating a fusion using the first detection data and the second detection data;
identifying an object in the environment of the robot using the fusion;
generating information content about the identified object;
associating redundancy information with the identified object, wherein (i) a first type of the redundancy information indicates that the identified object has been identified based only on the first detection data, (ii) a second type of the redundancy information indicates that the identified object has been identified based only on the second detection data, and (iii) a third type of the redundancy information indicates that at least one section of the identified object has been detected redundantly based on both of the first detection data and the second detection data;
adding the first type, second type, or third type associated redundancy information to the generated information content; and
controlling the robot at least partially automatically based on the generated information content and the added first type, second type, or third type associated redundancy information.

2. The method as claimed in claim 1 further comprising:
generating, based on the generated information content and the added first type or second type of the redundancy information, first control data associated with a first control maneuver for at least partially automated control of the robot; and
generating, based on the generated information content and the added third type of the redundancy information, second control data associated with a control maneuver for at least partially automated control of the robot, the second control maneuver different than the first control maneuver.

3. The method as claimed in claim 2 further comprising:
deferring control of the robot using the first control data, in response to the type of the redundancy information associated with the generated information content being the added first or second type of the redundancy information, until an update of the redundancy information to decide whether the object has been detected erroneously.

4. The method as claimed in claim 2 further comprising:
initially controlling the first control maneuver with the type of the redundancy information associated with the generated information content being the first type, the first control maneuver causing a motion-dynamically weaker reaction of the robot than the second control maneuver; and
further controlling the second control maneuver in response to an updated associated redundancy information being the third type of the redundancy information.

5. The method as claimed in claim 2, further comprising:
firstly determining that a first hazard in the environment of the robot can be excluded by executing the second control maneuver, the second control maneuver associated with a motion-dynamically stronger reaction of the robot than the first control maneuver;
secondly determining that the second control maneuver would not create a second hazard; and
controlling the second control maneuver based upon the first and second determination with the generated information content associated with an added first or second type of the redundancy information.

6. The method as claimed in claim 2 further comprising:
determining that one of the first or second detection device is not configured to detect the object within the associated first or second subsection of the environment; and
controlling the second control maneuver based upon the determination with the generated information content associated with an added first or second type of the redundancy information.

7. The method as claimed in claim 1, the identifying the object further comprising:
approximating a total object outline based on the fusion of the first detection data and the second detection data.

8. The method as claimed in claim 1, the identifying the object further comprising:
approximating (i) at least a first partial object outline based on the first detection data and (ii) at least a second partial object outline based on the second detection data,
wherein the third type of the redundancy information is associated with the identified object with both the first partial object outline and the second partial object outline associated with the identified object.

9. The method as claimed in claim 8 further comprising:
associating the first partial object outline and the second partial object outline with the identified object based on their respective feature vectors, which are associated with an object class.

10. The method of claim 1, wherein the method is carried out by executing commands of a computer program with a computer.

11. A non-transitory machine-readable memory medium configured to store a computer program for operating a robot that, when executed by a computer, causes the computer to execute the method of claim 1.

12. A device for operating an at least partly autonomous robot, the device configured to:
obtain first detection data, from a first detection device of the robot, associated with a first subsection of an environment of the robot;
obtain second detection data, from a second detection device of the robot, associated with a second subsection of the environment of the robot;
generate a fusion using the first detection data and the second detection data;
identify an object in the environment of the robot using the fusion;
generate information content about the identified object;
associate redundancy information with the identified object, wherein i) a first type of the redundancy information indicated that the detected object has been detected based only on the first detection data, (ii) a second type of the redundancy information indicates that the detected object has been detected based only on the second detection data, and (iii) a third type of the redundancy information indicates that at least one section of the detected object has been detected redundantly based on both of the first detection data and the second detection data;
add the first type, second type, or third type associated redundancy information to the generated information content; and
control the robot at least partially automatically based on the generated information content and the added first type, second type, or third type associated redundancy information.

13. The device as claimed in claim 12, wherein the device is further configured to:
generate, based on the generated information content and the added first type or second type of redundancy information, first control data associated with a first control maneuver for at least partially automated control of the robot; and
generate, based on the generated information content and the added third type of redundancy information, second control data associated with a second control maneuver for at least partially automated control of the robot, the second control maneuver different than the first control maneuver.

14. The device as claimed in claim 13, wherein the device is further configured to:
defer control of the robot, in response to the type of the information associated with the generated information content being the added first or second type of the redundancy information, until an update of the redundancy information to decide whether the object has been detected erroneously.

15. The device as claimed in claim 13, wherein the device is further configured to:
initially control the first control maneuver, the first control maneuver causing a motion-dynamically weaker reaction of the robot than the second control maneuver; and
further control the second control maneuver in response to an updated associated redundancy information being the third type of the redundancy information.

16. The device as claimed in claim 13, wherein the device is further configured to:
firstly determine that a first hazard in the environment of the robot can be excluded by executing the second control maneuver, the second control maneuver associated with a motion-dynamically stronger reaction of the robot than the first control maneuver;
secondly determine that the second control maneuver would not create a second hazard; and
control the second control maneuver based upon the first and second determination with the generated information content associated with an added first or second type of redundancy information.

17. The device as claimed in claim 13, wherein the device is further configured to:
determine that one of the first or second detection device is not configured to detect the object within the associated first or second subsection of the environment; and
control the second control maneuver based upon the determination with the generated information content associated with an added first or second type of the redundancy information.

18. The device as claimed in claim 12, wherein the device is further configured to identify the object by approximating a total object outline based on the fusion of the first detection data and the second detection data.

19. The device as claimed in claim 12, wherein the device is further configured to identify the object by approximating (i) at least a first partial object outline based on the first detection data and (ii) at least a second partial object outline based on the second detection data,
wherein the third type of redundancy information is associated with the generated information content with both the first partial object outline and the second partial object outline associated with the identified object.

20. The device as claimed in claim 19, wherein the device is further configured to:
associate the first partial object outline and the second partial object outline with the identified object based on their respective feature vectors, which are associated with an object class.

* * * * *

UNITED STATES PATENT AND TRADEMARK OFFICE
CERTIFICATE OF CORRECTION

| | | |
|---|---|---|
| PATENT NO. | : 12,351,209 B2 | Page 1 of 1 |
| APPLICATION NO. | : 17/424387 | |
| DATED | : July 8, 2025 | |
| INVENTOR(S) | : Schwindt et al. | |

It is certified that error appears in the above-identified patent and that said Letters Patent is hereby corrected as shown below:

In the Claims

In Claim 2, Column 11, Line 24 "a control maneuver" should read --a second control maneuver--.

Signed and Sealed this
Sixteenth Day of December, 2025

John A. Squires
*Director of the United States Patent and Trademark Office*